(12) United States Patent
Vollmar et al.

(10) Patent No.: US 11,777,382 B2
(45) Date of Patent: Oct. 3, 2023

(54) METHOD AND DEVICE FOR PROCESSING CONDUCTOR SEGMENTS OF A WINDING SUPPORT OF AN ELECTRIC MACHINE

(71) Applicant: STRAMA-MPS MASCHINENBAU GMBH & CO. KG, Straubing (DE)

(72) Inventors: Oliver Christian Vollmar, Stephansposching (DE); Andreas Ebenbeck, Straubing (DE)

(73) Assignee: STRAMA-MPS MASCHINENBAU GMBH & CO. KG, Straubing (DE)

( * ) Notice: Subject to any disclaimer, the term of this patent is extended or adjusted under 35 U.S.C. 154(b) by 333 days.

(21) Appl. No.: 16/634,374

(22) PCT Filed: Jul. 26, 2018

(86) PCT No.: PCT/EP2018/070340
§ 371 (c)(1),
(2) Date: Jan. 27, 2020

(87) PCT Pub. No.: WO2019/020765
PCT Pub. Date: Jan. 31, 2019

(65) Prior Publication Data
US 2021/0367488 A1 Nov. 25, 2021

(30) Foreign Application Priority Data
Jul. 27, 2017 (DE) ...................... 10 2017 116 973.3

(51) Int. Cl.
*B23K 26/00* (2014.01)
*B23K 37/00* (2006.01)
(Continued)

(52) U.S. Cl.
CPC ......... *H02K 15/0081* (2013.01); *B23K 26/21* (2015.10); *B23K 37/003* (2013.01); *B23K 37/0282* (2013.01); *B23K 37/0443* (2013.01)

(58) Field of Classification Search
CPC .. H02K 15/0081; B23K 26/21; B23K 37/003; B23K 37/0282; B23K 37/0443
See application file for complete search history.

(56) References Cited

U.S. PATENT DOCUMENTS 2,974,217 A * 3/1961 Crawford ........... B23K 11/0935
219/67
4,273,985 A * 6/1981 Paton ................. B23K 11/0935
219/60 R
(Continued)

FOREIGN PATENT DOCUMENTS

CA          2796499 A1 * 11/2011 ......... B23K 26/0604
CN     101370611 A  *  2/2009 ........... B23K 11/008
(Continued)

OTHER PUBLICATIONS

International Search Report for PCT/EP2018/070340 dated Oct. 15, 2018.

*Primary Examiner* — Kiley S Stoner
(74) *Attorney, Agent, or Firm* — DICKINSON WRIGHT PLLC (57) ABSTRACT

A method (100) for processing conductor segments (2) of a winding support (3) of an electric motor, wherein at least two conductor segments (2) are arranged on the winding support (3), wherein the conductor segments (2) protrude out of the end side of the winding support (3) by way of end sections (4). The method (100) ensuring sufficient precision when positioning the end sections joined for a welding operation using at least the following steps: advancing (200) a processing unit (6), which can be moved on a circular path (K) along a guide device (5) and having at least one first actuator element (7a) and at least one second actuator element (7b) to at least one first end section pair (4a, 4b) having a first end section (4a) and a second end section (4b) or the first end section (4a) and the second end section (4b)

(Continued)

to the processing unit (6), joining (300) the first actuator element (7*a*) and the second actuator element (7*b*) so that, in a clamping region (9), a clamping force joins the first end section (4*a*) and the second end section (4*b*) into a welding position, welding (400) the first end section (4*a*) and the second end section (4*b*).

10 Claims, 9 Drawing Sheets

(51) Int. Cl.
  *H02K 15/00*  (2006.01)
  *B23K 26/21*  (2014.01)
  *B23K 37/02*  (2006.01)
  *B23K 37/04*  (2006.01)

(56) References Cited

U.S. PATENT DOCUMENTS

| | | | |
|---|---|---|---|
| 4,375,024 A * | 2/1983 | Hayakawa | H01J 9/28 219/127 |
| 6,448,681 B1 | 9/2002 | Matsunaga et al. | |
| 6,834,422 B2 * | 12/2004 | Kato | H02K 15/0056 29/598 |
| 7,005,773 B2 | 2/2006 | Nakamura | |
| 7,735,709 B2 * | 6/2010 | Koppert | B23K 37/0211 228/103 |
| 8,499,438 B2 | 8/2013 | Agapiou et al. | |
| 8,584,346 B2 | 11/2013 | Berger et al. | |
| 9,073,143 B2 | 7/2015 | Perry et al. | |
| 10,036,083 B2 | 7/2018 | Schroth et al. | |
| 10,186,925 B2 | 1/2019 | Clampolini et al. | |
| 10,240,222 B2 | 3/2019 | Schroth et al. | |
| 10,312,777 B2 | 6/2019 | Frohlich et al. | |
| 2002/0041129 A1 | 4/2002 | Oohashi et al. | |
| 2003/0067239 A1 | 4/2003 | Nakamura | |
| 2006/0141874 A1 * | 6/2006 | Lenoir | B23K 26/26 439/874 |
| 2007/0154338 A1 * | 7/2007 | Sathian | B23K 1/0018 419/5 |
| 2008/0054750 A1 * | 3/2008 | Koike | H02K 3/30 219/145.23 |
| 2008/0148551 A1 * | 6/2008 | Hara | H02K 15/0081 29/598 |
| 2009/0100665 A1 | 4/2009 | Berger et al. | |
| 2012/0032550 A1 | 2/2012 | Wolf | |
| 2012/0216398 A1 * | 8/2012 | Agapiou | H02K 15/0081 29/745 |
| 2013/0056447 A1 * | 3/2013 | Perry | B23K 11/31 219/121.11 |
| 2013/0106231 A1 | 5/2013 | Chamberlin et al. | |
| 2013/0202427 A1 * | 8/2013 | Macelroy | F01D 25/28 228/119 |
| 2015/0375321 A1 * | 12/2015 | Cui | C22C 47/06 428/408 |
| 2016/0008911 A1 | 1/2016 | Schroth et al. | |
| 2016/0008912 A1 | 1/2016 | Schroth et al. | |
| 2016/0308413 A1 | 10/2016 | Clampolini et al. | |
| 2017/0252870 A1 * | 9/2017 | Cui | F01D 25/12 |
| 2017/0310198 A1 * | 10/2017 | Frohlich | H02K 3/12 |
| 2017/0346358 A1 | 11/2017 | Fukuda et al. | |
| 2017/0355471 A1 * | 12/2017 | Joern | B64C 1/068 |
| 2018/0050413 A1 * | 2/2018 | Scher | B23K 9/1675 |
| 2018/0166796 A1 * | 6/2018 | Yanagisawa | H02K 3/04 |

FOREIGN PATENT DOCUMENTS

| | | | | | |
|---|---|---|---|---|---|
| CN | 106180947 A | * | 12/2016 | | B23K 3/00 |
| CN | 106825827 A | * | 6/2017 | | |
| CN | 107150173 A | * | 9/2017 | | B23K 26/22 |
| CN | 106271075 B | * | 5/2018 | | |
| CN | 108161307 A | * | 6/2018 | | B23K 37/0435 |
| CN | 109175665 A | * | 1/2019 | | B23K 20/10 |
| CN | 112171100 A | * | 1/2021 | | |
| DE | 102 45 652 A1 | | 4/2003 | | |
| DE | 10 2006 019 311 A1 | | 10/2007 | | |
| DE | 10 2006 019 312 A1 | | 10/2007 | | |
| DE | 10 2006 019 314 A1 | | 10/2007 | | |
| DE | 600 33 268 T2 | | 10/2007 | | |
| DE | 102010028745 A1 | * | 11/2011 | | B23K 26/1429 |
| DE | 10 2012 202 830 A1 | | 8/2012 | | |
| DE | 10 2012 215 309 A1 | | 3/2013 | | |
| DE | 10 2013 225 667 A1 | | 6/2014 | | |
| DE | 10 2015 110 885 A1 | | 1/2016 | | |
| DE | 10 2014 226 710 A1 | | 6/2016 | | |
| EP | 1 128 527 B1 | | 2/2007 | | |
| EP | 1 376 819 B1 | | 8/2011 | | |
| EP | 3 240 147 A1 | | 1/2017 | | |
| EP | 3 082 228 B1 | | 5/2019 | | |
| FR | 2845536 A1 | * | 4/2004 | | B08B 5/02 |
| WO | WO-2017078528 A1 | * | 5/2017 | | |

\* cited by examiner

METHOD AND DEVICE FOR PROCESSING CONDUCTOR SEGMENTS OF A WINDING SUPPORT OF AN ELECTRIC MACHINE

CROSS-REFERENCE TO RELATED APPLICATIONS

This application is a 35 U.S.C. § 371 national phase of PCT International Application No. PCT/EP2018/070340, filed Jul. 26, 2018, which claims the benefit of priority under 35 U.S.C. § 119 to German Patent Application No. 10 2017 116 973.3, filed Jul. 27, 2017, the contents of which are incorporated herein by reference in their entirety.

FIELD OF THE INVENTION

The invention concerns a method and a device for processing conductor segments of a winding support of an electric machine, in particular a stator of an electric motor.

BACKGROUND

Such devices and methods are known in the prior art in many embodiments. In particular for applications in the field of electric mobility, electric machines, in particular electric motors, are required which fulfil high power demands. Often, electric motors are used in which the rotor or stator windings are configured not as well-known wire windings, but as I-shaped or U-shaped winding rods which are inserted in corresponding recesses in the plate stack of the rotor or stator, and are connected together, in particular welded, at the ends depending on the motor.

The methods and devices known in practice, however, have the disadvantage that it is not possible to guarantee sufficient precision in the positioning of the end portions which are brought together for a welding process.

The above-mentioned object is achieved in a generic method described herein, in that the joining takes place per individual pair of end portions, i.e. each end portion pair to be joined is brought together and welded in an individual process.

In the production of electric machines, in particular electric motors, electric conductor segments in the form of winding rods are attached to a winding support, e.g. the plate stack for a stator or a rotor of a motor, in order to serve as electrically conductive windings during operation of the motor.

SUMMARY AND INTRODUCTORY DESCRIPTION OF THE INVENTION

In the present case, to produce the windings of the electric machine, winding rods in the form of U-shaped or I-shaped winding rods are used, which are arranged in specially provided recesses on a winding support and are connected together at the ends depending on the design of the electric machine. In the case of U-shaped winding rods, the end portions need only be connected on one side, whereas for I-shaped winding rods, the end portions must be connected on both sides of the winding support. Before connection, the end portions of the conductor segments must if necessary be at least partially deformed, in particular; depending on the design of the electric machine; the radial distance and/or the distance in the circumferential direction between the end portions of the conductor segments must be changed, for example in order to weld two end portions.

The method provides that firstly, a processing unit, which can be moved on a circular path along a guide device and comprises at least one first actuator element and at least one second actuator element, is advanced to at least one first end portion pair having a first end portion and a second end portion. By this advance, the end portions come into the working region of the processing unit, in particular of the first actuator element and second actuator element, such that they can be processed by the actuator elements. Alternatively, it is provided that the first end portion and the second end portion, in particular the winding support with the conductor segments, are advanced to the processing unit, in particular to the first actuator element and the second actuator element. In any case, a relative movement takes place between the guide device and the end portions.

In particular, it is provided that the winding support is held for example in a holding device, and the guide device together with the processing unit is advanced to the winding support, in particular its conductor segments with the end portions, preferably such that a central axis of the circular path is arranged coaxially with a central axis of the winding support. Then the first actuator element and the second actuator element are brought together so that, in a clamping region, at least one clamping force caused by the bringing together of the first actuator element and the second actuator element brings together the first end portion and the second end portion into a welding position. The bringing together of the first end portion and second in portion preferably takes place in a plane to which the central axis of the circular path is a normal.

In particular, the bringing together of the first end portion and second end portion of an end portion pair takes place individually, so that on each bringing together, only one first end portion and one second end portion are brought together. By bringing the first end portion and second end portion together individually by means of the first actuator element and the second actuator element, the end portions are brought together very precisely so that they can then be welded advantageously. Welding takes place in particular by means of laser welding.

Preferably, on bringing together, the first actuator element and the second actuator element are moved towards each other on a common theoretical axis, in order to move the first end portion and second end portion towards each other, in particular in a radial direction to the circular path of the guide device, until they lie against each other. For this, the first actuator element and the second actuator element are moved relative to each other, and the first end portion and the second end portion are clamped between the first actuator element and the second actuator element.

When the first end portion and the second end portion lie against each other, in particular under the action of a clamping force, the welding position has been reached. Welding may then take place in this welding position.

According to a first embodiment of the method, it is provided that the first actuator element and the second actuator element exert at least one clamping force on the end portion pair, i.e. forces acting opposite each other on the first end portion and second end portion, until the welding is complete. The first end portion and the second end portion are consequently not only deformed elastically and plastically until they lie against each other, but are held in the welding position in which respectively at least one face of the first end portion and at least one face of the second end portion lie against each other, until the welding process is fully completed. Then the first actuator element and the second actuator element are moved apart from each other in opposite directions, and in particular travel along the circular path to a next end portion pair to be welded.

According to a refinement of the invention, it has proved particularly advantageous if the bringing together of the first actuator element and the second actuator element takes place parallel to a radial direction starting from a central axis of the circular path. In particular, the bringing together takes place in a radial direction starting from the central axis of the circular path, preferably in a plane normal to the central axis. The conductor segments are held circumferentially on the winding support, wherein the first end portion is preferably arranged on a smaller radius, relative to the central axis of the winding support, than the second end portion. In order to now bring together and connect the first end portion and second end portion in this radial direction, the first actuator element and the second actuator element are held on the processing unit such that they can act on the end portions in the direction of the central axis of the circular path of the guide device, in particular in the direction of the central axis of the winding support. The first end portion is accordingly at least partially moved radially in the direction of the smaller radius, while the second end portion is moved radially in the direction of a larger radius, until the two meet.

According to a further embodiment of the method, it has proved advantageous if a plurality of conductor segments, in particular a plurality of end portion pairs is present, and all end portion pairs are brought together and welded in succession by multiple method procedures. Here, a first end portion of an end portion pair is formed on a larger radius by a conductor segment arranged on a larger radius, and a second end portion of an end portion pair is formed by a conductor segment arranged on a smaller radius. The processing unit now travels to each end portion pair in succession, in particular along the circumference, and joins this together so that the end portion pair can then be welded. The processing unit is here guided on the circular path so that each end portion pair can be approached.

According to a refinement, the processing time can advantageously be reduced if at least two processing units are present, and the processing units are controlled such that at least one first processing unit holds an end portion pair in the welding position while at least one second processing unit is moved to an end portion pair yet to be welded. The processing units are guided together on the guide device and are therefore matched to each other in their movement. Due to the presence of at least two processing units, one processing unit can already hold an end portion pair in the welding position while the second processing unit is guided to the next end portion pair in order to bring these into the welding position. In this way, advantageously, the capacity of the welding device can utilized more fully.

Particularly preferably, it is provided that three processing units are present which are guided together on the guide device. With three processing units, it is advantageous to control these such that two processing units each hold an end portion pair in its welding position while the third processing unit approaches a new pair at a new usage position. Each processing unit travels to the next end portion pair when the welding process is complete. Because of the very short usage times of the welding device, in this way always at least one end portion pair is in the welding position, so that the welding device can be utilized to 100%, apart from its own travelling times.

Preferably, the quality of the weld connection may be increased in a further embodiment of the method if, by means of an alignment geometry of the first actuator element and/or the second actuator element, an alignment of the first end portion and/or of the second end portion takes place during the bringing together and/or in the welding position. The alignment geometry, which for example comprises a contact face and sloping guide faces on the actuator elements, ensures that insofar as the end portions of an end portion pair are not yet in an optimal position relative to each other, the first end portion and the second end portion are guided into an optimal starting position for welding during the bringing together and/or while in the welding position, namely so that at least two faces of the first end portion and second end portion lie superficially flush against each other. The first end portion and the second end portion can then be welded together. The alignment geometry also corrects rotational mispositionings of the first end portion and/or second end portion.

In particular in winding supports with conductor segments on four different radii starting from a central axis of winding support, the processing time may be reduced if an end portion pair lying on the inside in a radial direction starting from a central axis of the circular path, and an end portion pair lying radially on the outside, are brought together and welded successively or simultaneously. In particular, it is also provided that conductor segments are arranged on six or eight different radii, so that respectively three or four end portion pairs are arranged in the radial direction.

In the case of temporally successive processing, one processing device initially approaches an inner or an outer end portion pair, brings this end portion pair together and holds it together until it is welded. Then the processing unit travels to the respective other end portion pair or to the respective other end portion pairs in the radial direction and brings these together until welded. Since the processing unit in this exemplary embodiment need only travel radially, this shortens the travelling time and hence the overall processing time.

It is however particularly advantageous if a radially inner end portion pair and an outer end portion pair, or several end portion pairs arranged in a radial direction, are brought together simultaneously by the two actuator elements so that the welding device can first weld the one and then directly afterwards the other end portion pair. For this, the actuator elements are for example formed cranked or bent so that both end portion pairs can be brought together simultaneously, and remain accessible to the welding device for welding in particular in the direction parallel to a central axis of the circular path.

According to a further embodiment of the method, the processing time may be further optimized in that an end portion pair lying on the inside in a radial direction starting from a central axis of the circular path is brought together by means of a first actuator element and a second actuator element; of a first processing unit; and an end portion pair lying radially on the outside is brought together by means of a third actuator element and a fourth actuator element; with a second processing unit. The method is preferably performed with at least two processing units which are guided along circular paths of different radii on the guide device. The radially inner processing unit can bring together the radially inner end portion pairs, and the radially outer processing unit can bring together the radially outer end portion pairs, and hold them in their welding positions. This exemplary embodiment is particularly suitable for winding supports on which conductor segments are arranged on four different radii starting from a central axis of the winding support.

Preferably, in order to extend the service lives of the actuator elements, according to a further embodiment of the method, it is provided that the first actuator element and/or the second actuator element are cooled, in particular actively cooled, at least during the welding. For this, a cooling device is controlled such that an actuator element or both actuator elements are cooled actively or passively during the welding process, in particular during laser welding, for example by means of liquid or gas conduction or by means of a fan. Furthermore, it is also provided that the cooling device is controlled such that the actuator elements are actively cooled, accordingly throughout the entire time of performance of the method. Cooling by convection has proved advantageous.

The object cited initially is furthermore achieved with a device for processing conductor segments of a winding support of an electric machine, in particular an electric motor, with the features described herein. The device comprises at least one guide device and at least one processing unit. The processing unit is movable along the guide device on a circular path, in particular on the guide device. The processing unit comprises at least one first actuator element and at least one second actuator element, wherein the first actuator element and the second actuator element are movable relative to each other such that at least one clamping force can be applied in a clamping region between the first actuator element and the second actuator element.

The device preferably has at least one receiving region in which a winding support, with conductor segments arranged thereon, may be arranged with its central axis coaxially to a central axis of the circular path. For example, for this the winding support is advanced to the device until it is arranged in the receiving region, and/or the device is advanced to the winding support, for example held on a holding device, until the winding support is arranged in the receiving region with its central axis coaxially to the central axis of the circular path. The at least one processing unit can then be guided on the circular path along the guide device around the winding support so that, step by step, all end portions or end portion pairs can be approached by the processing unit, brought together and then welded.

By guiding the processing unit on a circular path, the positioning of the processing unit relative to the end portions is simplified. The first actuator element and the second actuator element are configured and arranged on the processing unit such that the first actuator element and the second actuator element can exert a clamping force, in particular in the radial direction starting from the central axis of the circular path, in a clamping region between the first actuator element and second actuator element. By bringing together the first actuator element and second actuator element, the end portions arranged in the clamping region, in particular a radially inner end portion and a radially outer end portion, are deformed elastically and/or plastically until the end portions are in their welding position, namely at least one face of the first end portion lies flat and flush on a face of the second end portion.

Advantageous materials for the device, in particular for the actuator elements and/or the guide device, are in particular X153CrMoV12, 100Cr6, X90CrMoV18, 40NiCrMo6, 16MnCr5, 42CrMo4 and/or X155CrVMo12-1.

According to a refinement, in particular the processing speed of the device is increased if at least two processing units are guided on the guide device, in particular three, four, five or six processing units are guided on the guide device. The processing units are guided jointly on the guide device and controlled such that the processing units move without influencing each other. In the case of a plurality of processing units, only some of the end portions of a winding support are processed by one processing unit, and the other parts by the other processing units.

For example, in the case of three processing units on a common guide device, these are controlled such that the respective end portion pair is held in the welding position on two processing units at all times, while the third processing unit is repositioned. Optimal use of capacity of the welding device can thus be guaranteed. After completion of the welding process at the respective end portion pair, the respective processing unit is moved to an end portion pair yet to be connected.

According to one embodiment of the device, it is proposed that the guide device has at least one circular rail element, in particular at least one rail element with teeth. Preferably, the guide device is configured as a circular rail arrangement on which the processing units are guided. Due to the circular rail element, the processing unit can advantageously be guided around the winding support on the circular path in order to bring together all end portion pairs successively. For this, the processing unit or units have a guide means with which they can be guided on the rail system along the circular track. The guide means is for example configured as a guide roller or rollers, sliding elements, and/or a ball guide. Preferably, at least one rail element has teeth, in particular teeth in which a gearwheel can engage so that the processing unit can be advanced on the guide device via the teeth and gearwheel, and be guided precisely.

Also, according to one embodiment, it has proved advantageous if it is provided that the processing unit is movable on the guide device by means of a drive, in particular if the drive is configured as an electric motor and/or linear motor, and/or is pneumatic and/or hydraulic, and/or is formed by cam discs and/or friction wheels. The movability of a processing unit along the guide device is accordingly implemented by one or more of the above drive concepts. Particularly preferably, a processing unit has an electric motor with at least one gearwheel, wherein the gearwheel cooperates with teeth on at least one rail element of the guide device or a toothed rail on a rail element, such that a rotation of the gearwheel causes a movement of the processing unit along the guide device on a circular path.

According to a further embodiment of the device, it is provided that the processing unit has a base plate, and that at least one drive, the first actuator element and the second actuator element are arranged on the base plate. The base plate can accordingly be moved by the drive along the guide device. If accordingly the base plate is moved on the circular path around the central axis, consequently the actuator elements are also moved on a circular path, whereby the actuator elements can travel from one end portion pair to the next end portion pair.

According to a refinement, it is furthermore provided that the actuator elements can be moved towards each other by electric motor and/or linear motor and/or pneumatically and/or hydraulically. A pneumatic or servo-electric drive has proved particularly advantageous. To bring together the end portions of an end portion pair, the actuator elements must be moved towards each other and driven for this purpose. This drive is configured according to at least one of the above-mentioned drive concepts or a combination thereof. In any case, the drive is designed such that it can apply the necessary forces for bringing together and hence for elastic and/or plastic deformation of the end portions of the end portion pair.

In particular, damage or contamination of the surrounding end portions and/or the processing unit is prevented if the processing unit has at least one spatter protection device, in particular at least one spatter protection plate. The spatter protection device or spatter protection plate is arranged such that contamination of the surrounding end portions and/or the processing unit caused by a welding process is reliably prevented, in that the spatter protection device retains any contamination.

The precision of the processing unit may be further increased if the actuator elements are configured as actuator rods. Due to the linear extension of the actuator rods, the extension of which in a transverse and height direction is significantly smaller than that in a longitudinal direction, the end portions can be approached and moved individually. Preferably, each end portion is moved by a respective actuator element so that the end portions meet and are brought together approximately in the middle of their original spacing in the radial direction.

In a further embodiment, the variability of the device can be increased if the first actuator element and the second actuator element are held in particular on a control head so as to be adjustable about a rotation axis. The rotation axis is preferably oriented parallel to the central axis of the circular path, so that the actuator elements can be oriented for example onto end portions or end portion pairs which are arranged on different radii. In particular, the device may then be used for winding supports with different radii.

In particular, the service life of the device may be extended if the first actuator element and/or the second actuator element comprises a cooling device. The cooling device serves for cooling at least part of, in particular the complete actuator elements, and for example comprises recesses within the actuator elements through which a cooling medium, in particular a liquid or a gas, e.g. compressed air, may flow. The cooling reduces the wear on the actuator elements and extends their service life.

In a refinement of the device, a region of an actuator element which can be contacted by an end portion has a trapezoid receiving region; an alignment geometry; which in particular has a contact face oriented orthogonally to a longitudinal axis of the actuator element, and two sloping guide faces. The receiving region serves for correctly positioning the end portions so they are advantageously oriented in the welding position. For this, a contact face is provided which is preferably oriented such that a radial direction, starting from the central axis of the circular path, is a planar normal to a plane in which the contact face is arranged. The sloping guide faces are arranged with a cross-section of trapezoid form starting from the contact face, so that an end portion is guided by the guide faces in the direction of the contact face. In the welding position, the contact face lies flat on a face of the end portion.

To increase the effectiveness of the device, it is provided that the first actuator element and the second actuator element are cranked so that end portions can be processed on different radii, in particular on two, four, six or eight different radii. It is also provided that the actuator elements are configured so as to be cranked, such that in each case two, three or four end portion pairs can be brought together simultaneously or successively by means of the actuator elements.

According to a further embodiment of the device, it has also proved advantageous if the first actuator element and/or the second actuator element is at least partially coated, in particular with a coating of a ceramic. In order to prevent the welding process from influencing the actuator elements, it is provided that the actuator elements are coated, at least in the regions in which they come into direct contact with the end portions. Preferably, the actuator elements are completely coated. As well as a coating of ceramic, coatings have proved advantageous which are applied by means of physical gas phase deposition with titanium carbide, titanium chromium nitride or zirconium carbonitride, and/or by means of chemical gas phase deposition with titanium carbide or titanium nitride/titanium carbide.

BRIEF DESCRIPTION OF THE DRAWINGS

In detail, there are now many possibilities for configuring and refining the method and the device. For these, reference is made to the following description of preferred exemplary embodiments in connection with the drawing. The drawing shows.

DETAILED DESCRIPTION

Figure 1:
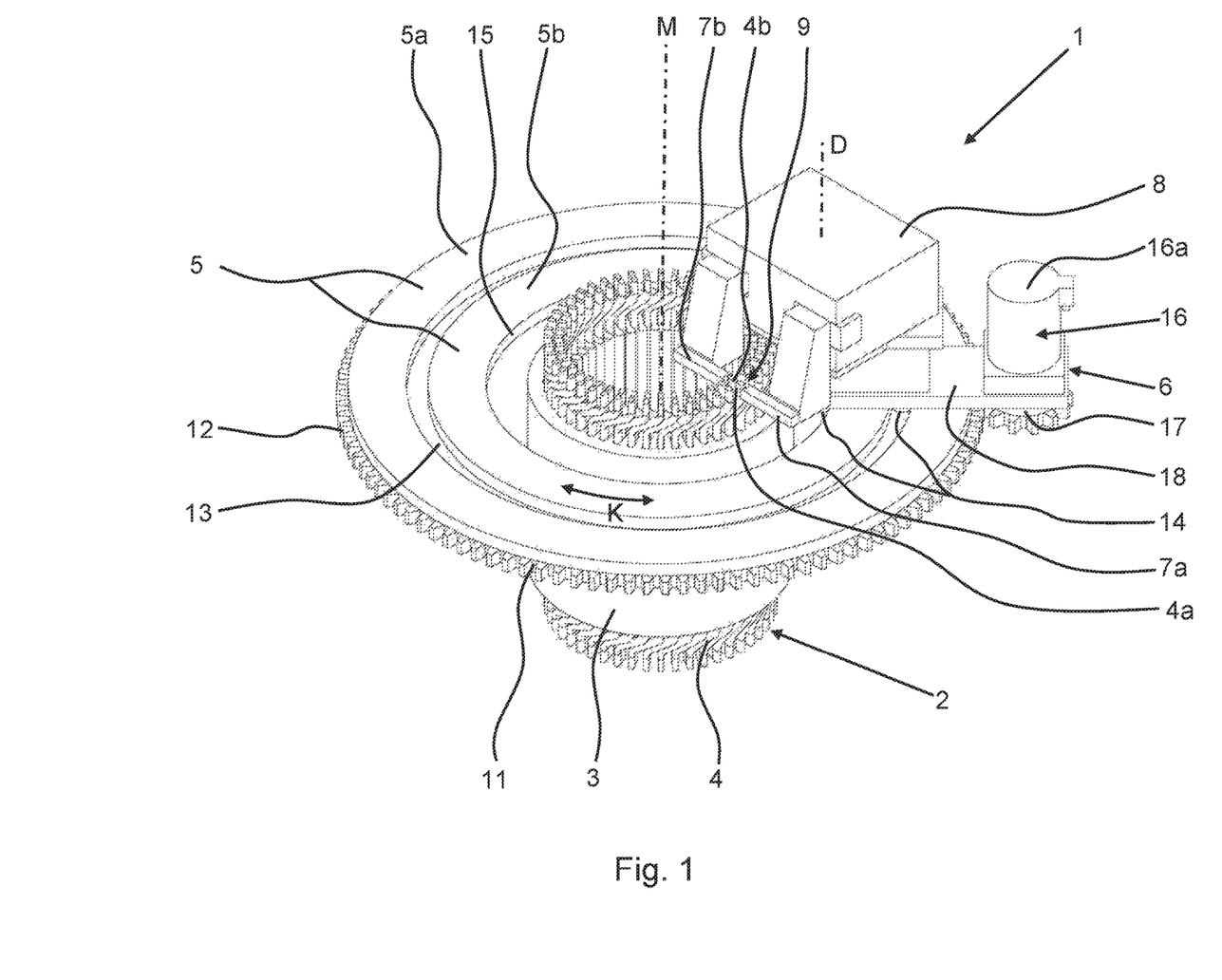
FIG. 1 shows an exemplary embodiment of a device in perspective view.

FIG. 1 shows an exemplary embodiment of a device 1 for performance of a method 100 for processing conductor segments 2 of a winding support 3 of an electric machine, here a stator of an electric motor. End portions 4 of conductor segments 2 protrude from the winding support 3 on both ends. In the exemplary embodiment shown, the end portions 4 are already twisted, i.e. twisted out of the starting position about the central axis M.

According to FIG. 1, the method step of advance 200 (see also FIG. 9) of a guide device 5 with a processing unit 6 which can be moved on a circular path on the guide device 5, or of a first end portion 4a and a second end portion 4b up to the processing unit 6, has already taken place. In this exemplary embodiment, the guide device 5 is configured as a circular rail element.

The processing unit 6 comprises a first actuator element 7a and a second actuator element 7b which, in this exemplary embodiment, are held in a control head 8 so as to be pneumatically movable. The first actuator element 7a and the second actuator element 7b are guided along a theoretical common axis which is oriented in the radial direction R (referring to FIG. 4) to a central axis M of the circular path K. The first actuator element 7a and the second actuator element 7b are held such that they are always aligned in a radial direction R starting from the central axis M.

Figure 2:
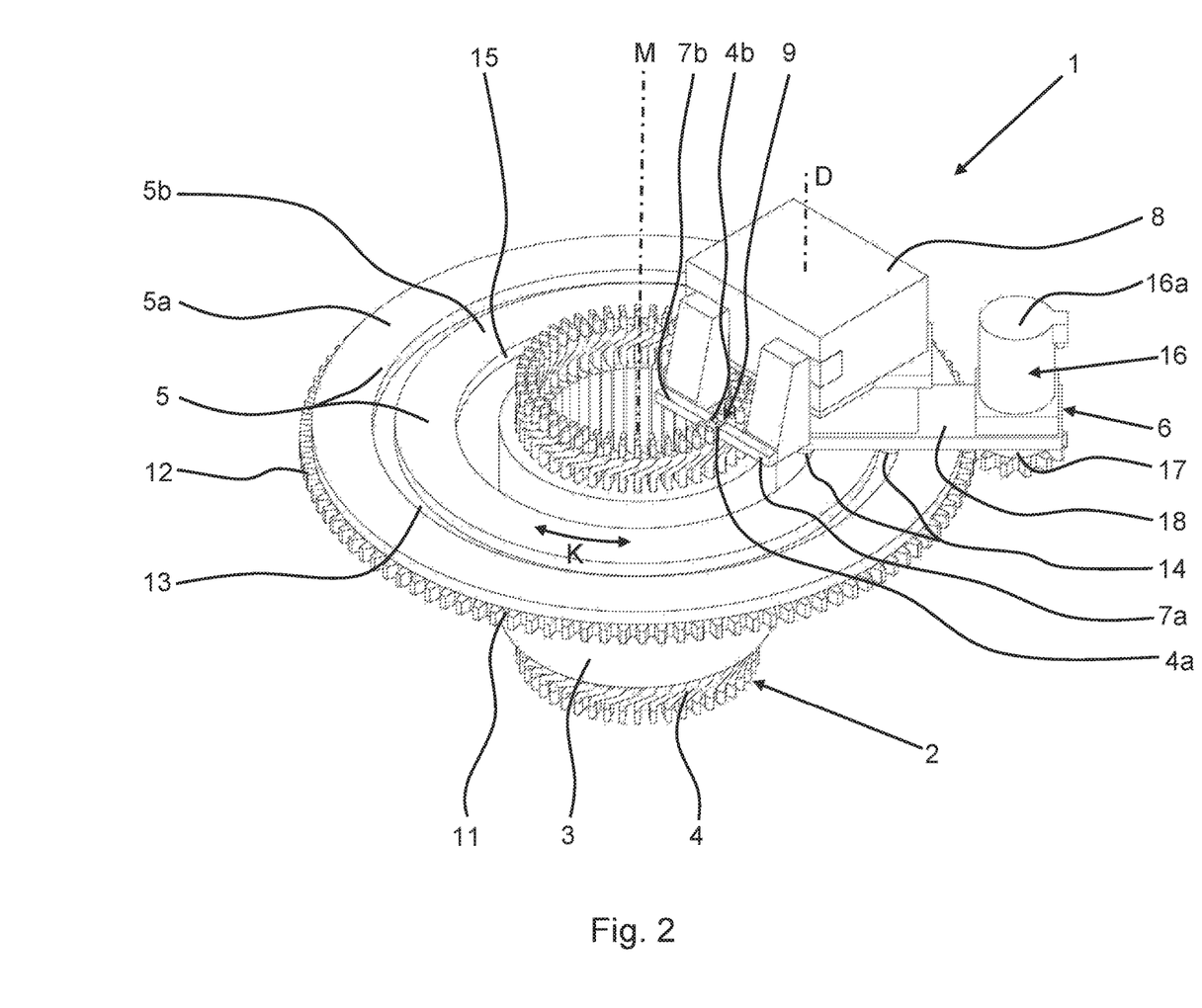
FIG. 2 shows the exemplary embodiment of the device from FIG. 1 in a further state.
Figure 3:
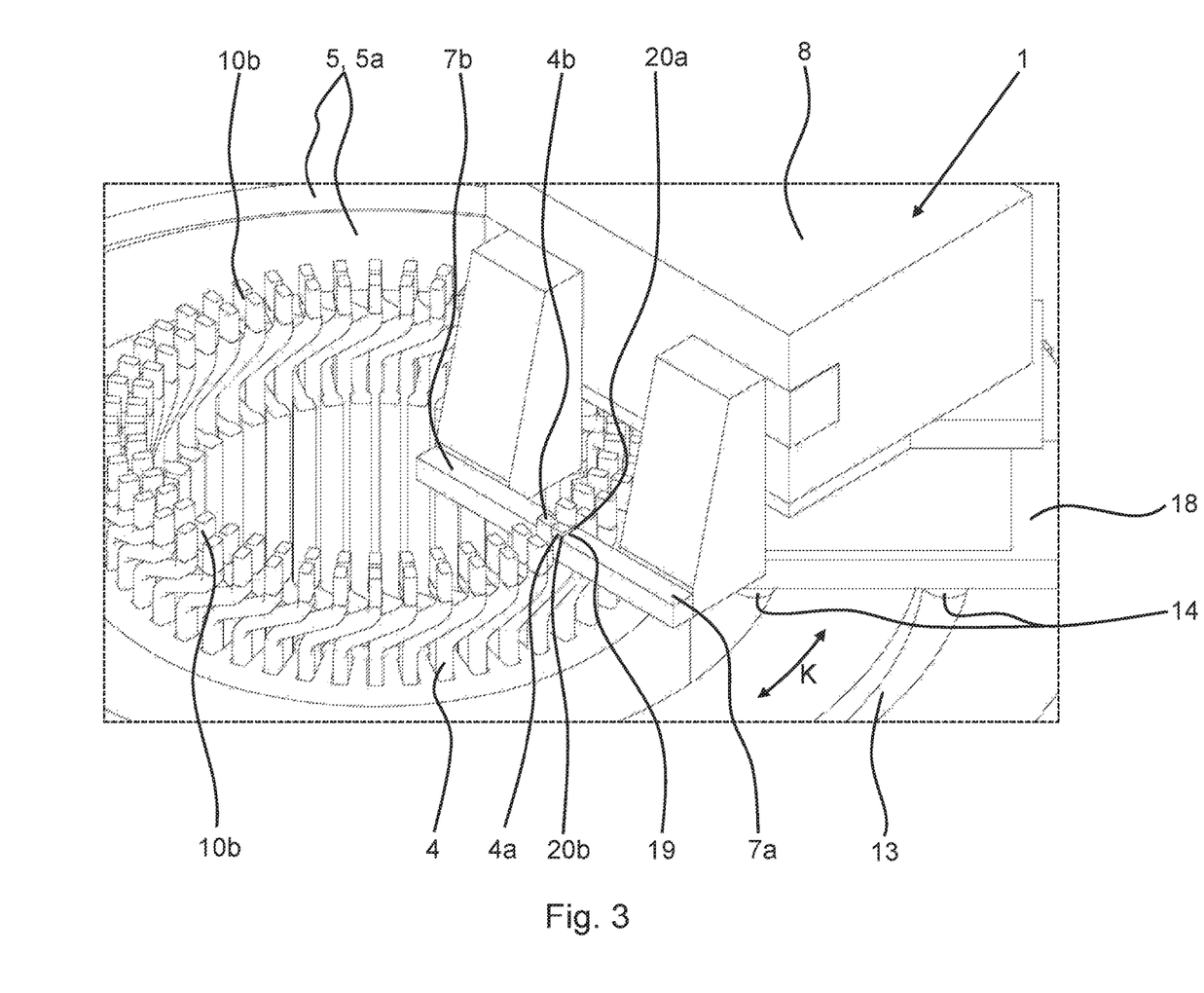
FIG. 3 is an enlargement of an extract from FIG. 2.
Figure 9:
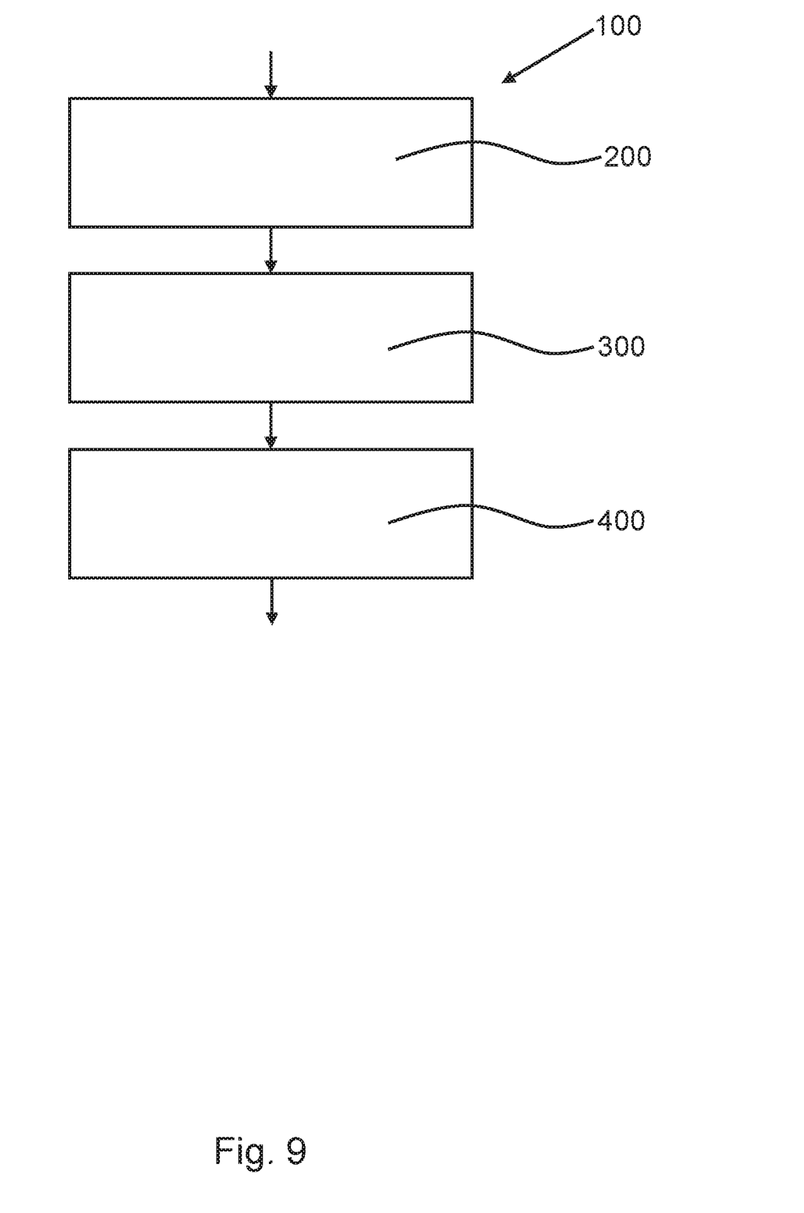
FIG. 9 is a diagrammatic sequence of a method.

Starting from the state of the device 1 shown in FIG. 1, according to FIG. 9 the first actuator element 7a and the second actuator element 7b are brought together 300 in the radial direction R (referring to FIG. 4) such that a clamping force, resulting from two opposing forces caused by the first actuator element 7a and the second actuator element 7b, is exerted in a clamping region 9 onto the first end portion 4a and the second end portion 4b, such that the first end portion 4a and the second end portion 4b are brought together into a welding position shown in FIG. 2 and FIG. 3. Starting from the welding position shown in FIG. 2 and FIG. 3, the first end portion 4a may be welded 400 to the second end portion 4b by means of laser welding, see FIG. 9.

FIG. 2 and FIG. 3 show the device according to FIG. 1 in the welding position in which welding 400 of the first end portion 4a and the second end portion 4b may take place directly. The first end portion 4a and the second end portion 4b are brought together parallel to the radial direction R (referring to FIG. 4) starting from the central axis M of the circular path and also of the winding support 3, so that the side faces 10a and 10b (shown in FIG. 3) of the first end portion 4a and the second end portion 4b lie flat against each other. The two actuator elements 7a, 7b (formed as actuator rods) each apply a clamping force in opposite directions along the radial direction R.

Figure 4:
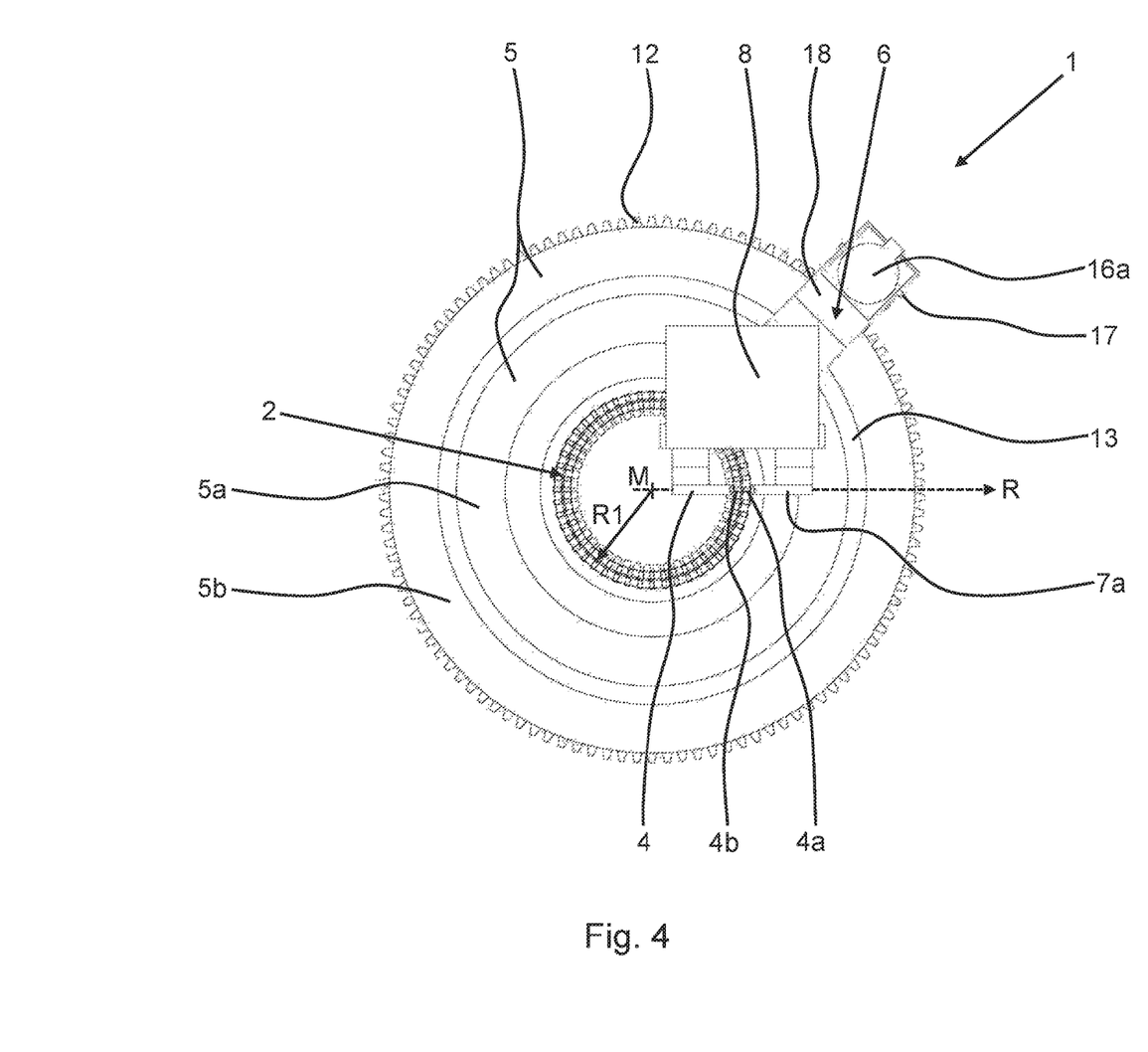
FIG. 4 is a top view of a device from FIG. 1.

After the end portion pair 4a, 4b (held in the welding position) has been welded, the processing unit 6 releases the first actuator element 7a and the second actuator element 7b by moving these apart again in opposite directions, shown as an example in FIG. 4. From this state, the processing unit 6 may then travel to the next end portion pair 4a, 4b in order to bring together 300 this end portion pair 4a, 4b in a similar fashion.

According to FIGS. 1 to 4, the guide device 5 is configured as a circular rail segment with an outer rail ring 5a and an inner rail ring 5b, wherein the outer rail ring 5a furthermore has a toothed ring 11 with teeth 12. A guide groove 13 is formed between the inner rail ring 5b and the outer rail ring 5a. The processing unit 6 is guided with guide rollers 14 in the guide groove 13 and on the inner circumference 15 of the inner rail ring 5b.

The processing unit 6 can be moved by a drive 16 on the guide device 5, wherein in this exemplary embodiment the drive 16 is formed as an electric motor 16a with a gearwheel 17. The gearwheel 17 cooperates with the teeth 12 of the toothed ring 11 so that the processing unit 6 is movable along the circular path K. The processing unit 6 has a base plate 18 on which the drive 16 and the control head 8 with actuator elements 7a, 7b are held. The control head 8 is held so as to be rotationally adjustable about a rotation axis D which runs substantially parallel to the central axis M, so that the actuator elements 7a, 7b can be aligned on different radii R1, see FIG. 4.

Figure 5:
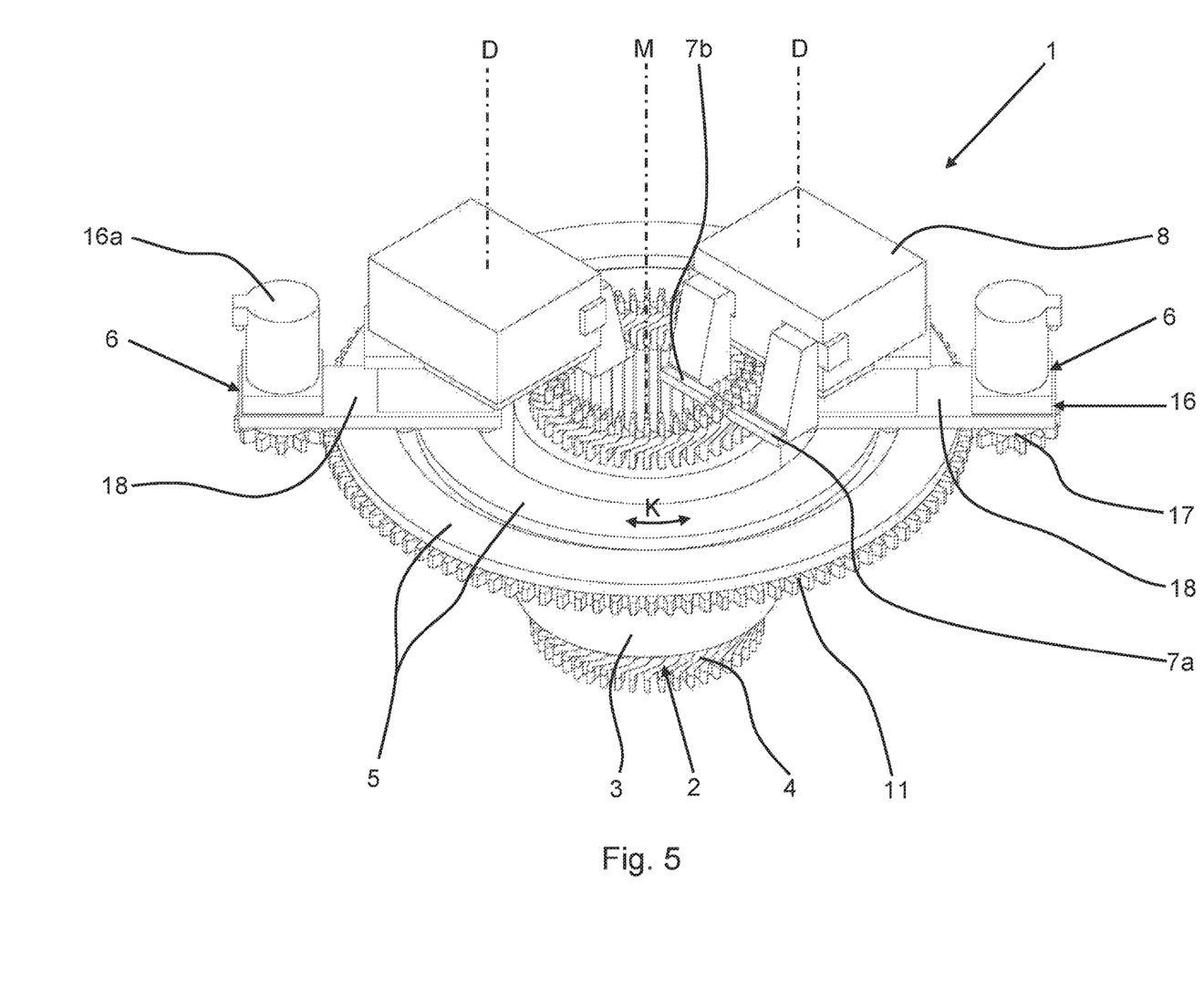
FIG. 5 shows an exemplary embodiment of a device in perspective view.
Figure 6:
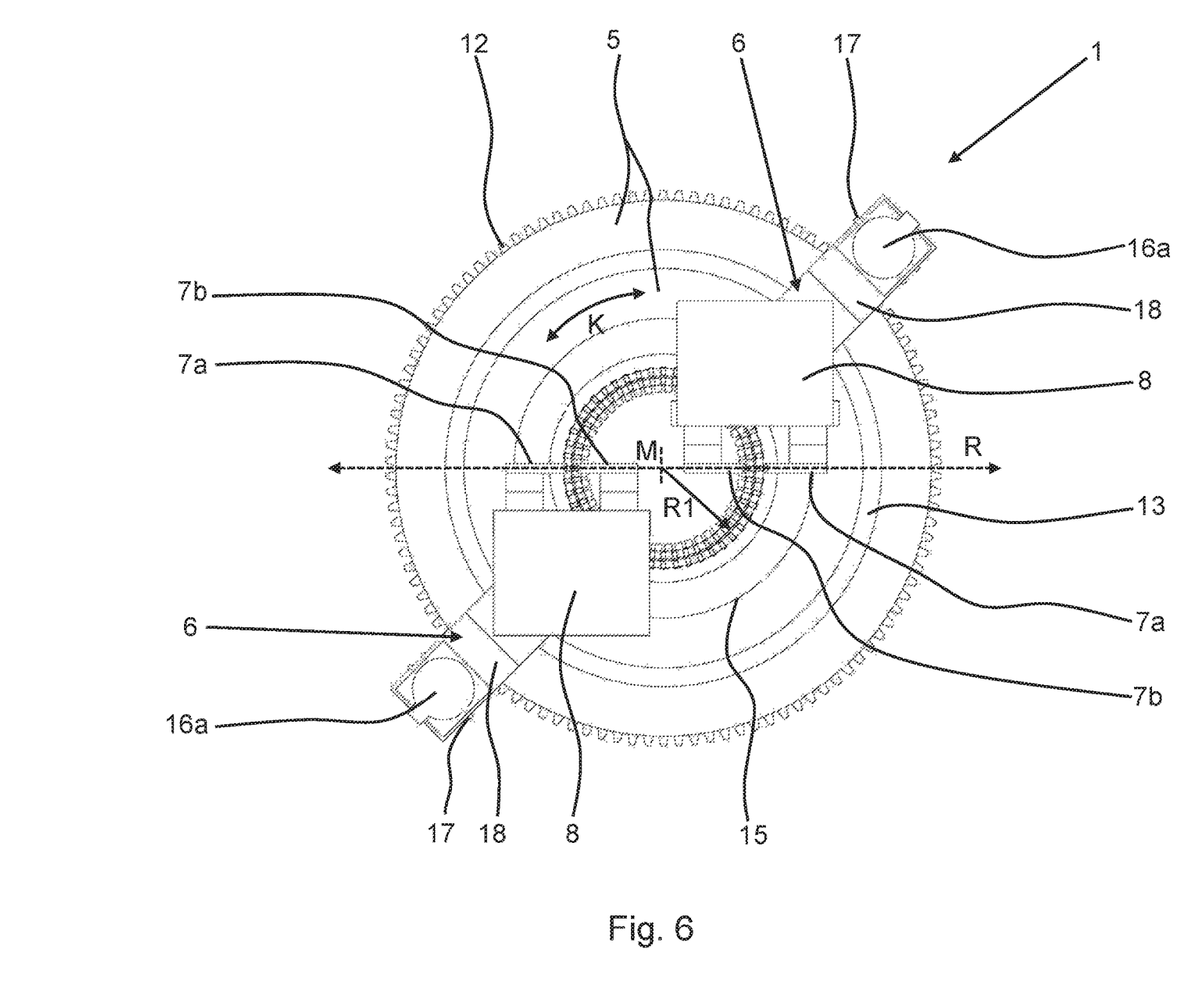
FIG. 6 is a top view of the exemplary embodiment in FIG. 5.

FIG. 5 and FIG. 6 show an exemplary embodiment of a device 1 with two processing units 6. FIG. 5 shows the exemplary embodiment in perspective view, FIG. 6 in top view. The processing units 6 are held on the common guide device 5 so as to be movable along the circular path K, so that the processing units 6 can step by step approach and bring together all end portion pairs 4a, 4b. In this exemplary embodiment, the actuator elements 7a, 7b are held on the same radius R1 so that the processing time is shortened due to the presence of two processing units 6, and the capacity of a welding device (not shown) can be utilized more fully. The processing units 6 are configured to be identical to the processing unit 6 shown in FIGS. 1 to 4.

Figure 7:
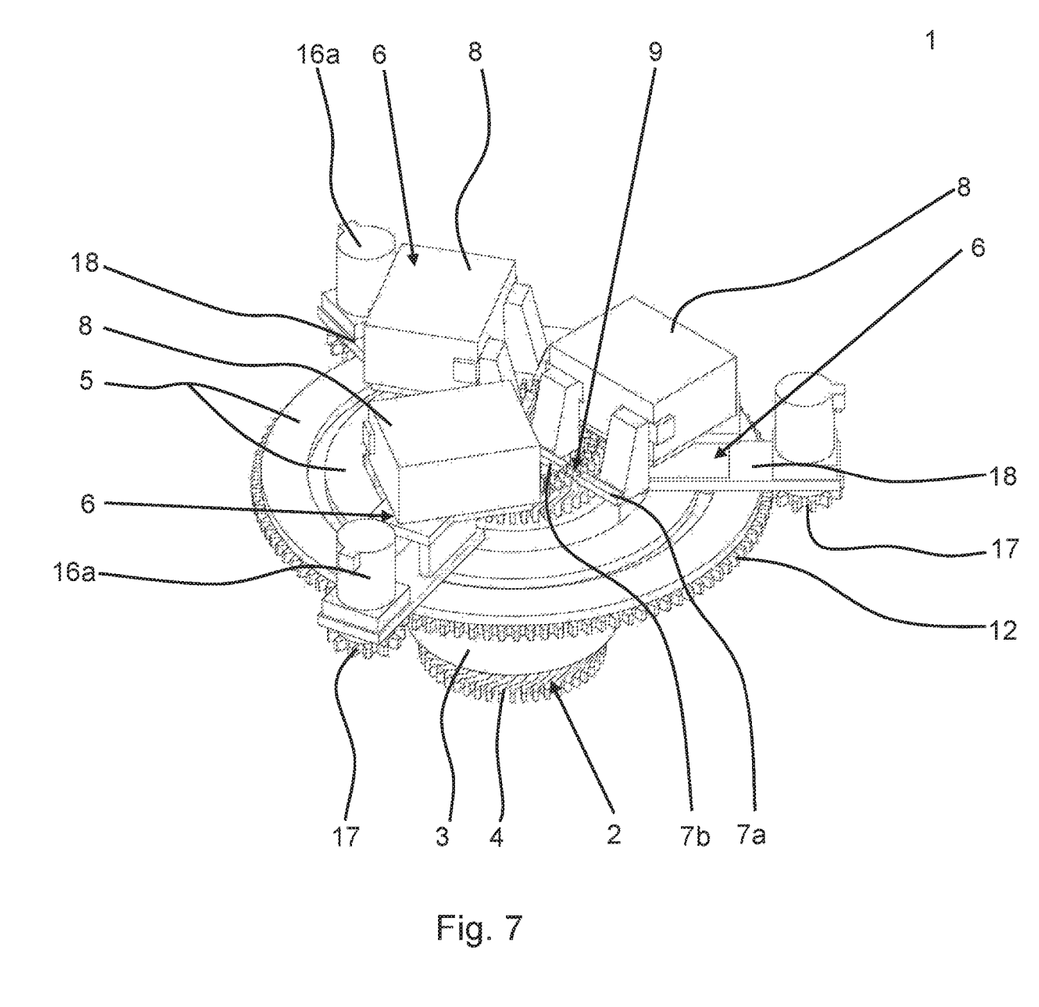
FIG. 7 shows an exemplary embodiment of a device in perspective view.
Figure 8:
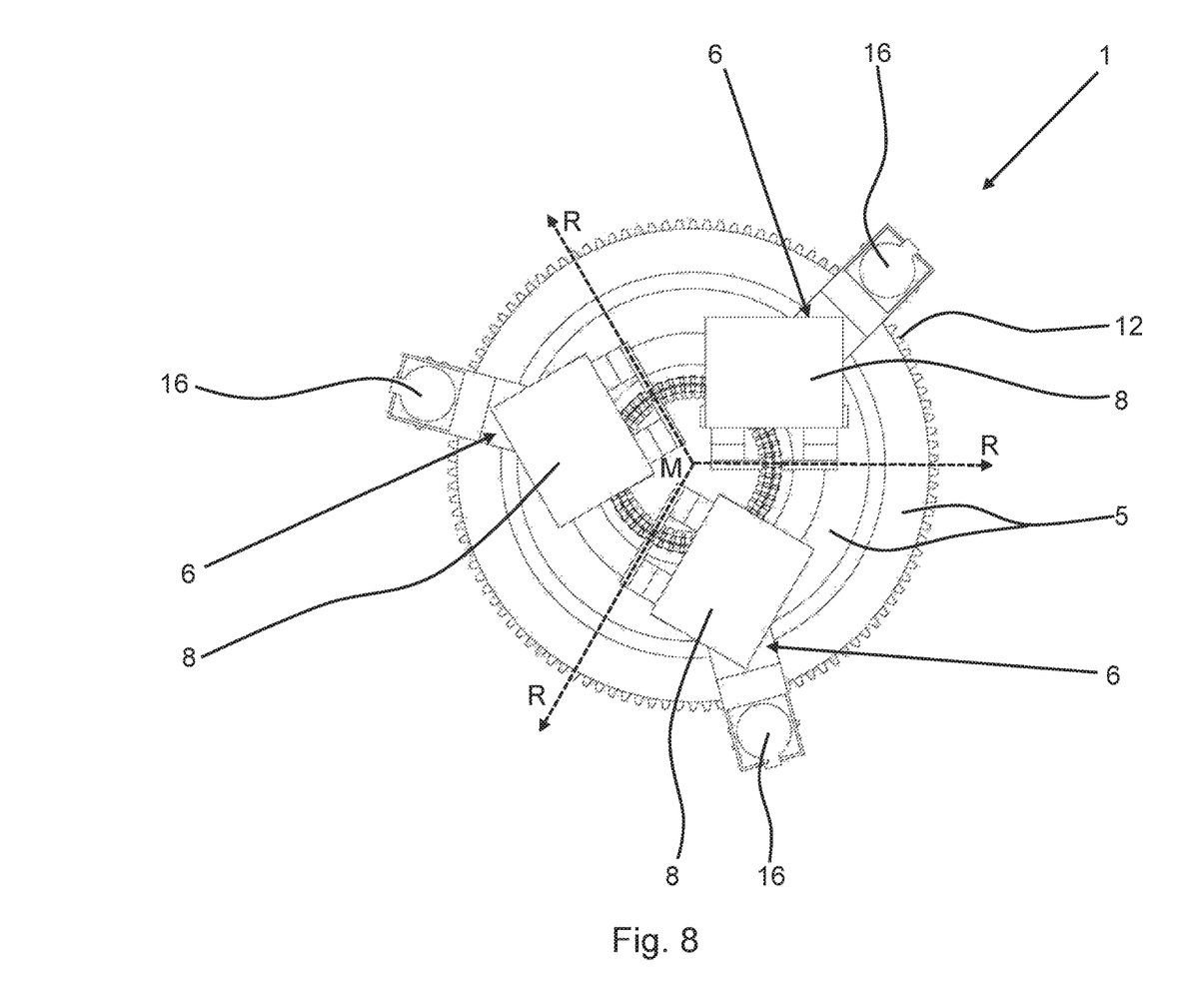
FIG. 8 is a top view of the exemplary embodiment in FIG. 7.

FIGS. 7 and 8 show an exemplary embodiment of a device 1 with three processing units 6 guided on the common guide device 5. The processing units 6 are controlled such that two processing units 6; shown at the bottom and on the left in FIG. 8; always hold the respective end portion pair 4a, 4b in the welding position, while the third processing unit 6; shown at the top right in FIG. 8; travels to an end portion pair 4a, 4b to be welded. All processing units 6 are identical to the processing unit 6 shown in FIGS. 1 to 4, and each has a drive 16, a base plate 18, and a control head 8 with actuator elements 7a, 7b guided thereon. The actual movement takes place by cooperation of the toothed ring 11 with teeth 12 and the gearwheel 17.

In order to align and guide the end portions 4a, 4b, the actuator elements 7a, 7b have an alignment geometry; visible in particular in FIG. 3; which has a contact face 19 and two sloping guide faces 20a, 20b. The guide faces 20a, 20b guide an end portion 4a, 4b in the direction of the contact face 19.

FIG. 9 shows diagrammatically the sequence of an exemplary embodiment of a method 100 for processing conductor segments 2 of a winding support 3 of an electric machine. According to the method 100, firstly a processing unit 6, which is movable along a circular path K along a guide device 5 and comprises at least one first actuator element 7a and at least one second actuator element 7b, advances in step 200 to at least one first end portion pair 4a, 4b having a first end portion 4a and a second end portion 4b, or the first end portion 4a and the second end portion 4b advance to the processing unit 6, see also FIG. 1.

Then the first actuator element 7a and the second actuator element 7b are brought together in step 300 so that at least one clamping force, acting with opposing forces in a clamping region 9, brings together the first end portion 4a and the second end portion 4b into a welding position, see also FIG. 2. The bringing together in step 300 preferably takes place in a plane to which the central axis M of the circular path K or of the winding support 3 is a planar normal.

Then the welding in step 400 takes place of the first end portion 4a and of the second end portion 4b by means of laser welding. It is then provided that the first actuator element 7a and the second actuator element 7b are released again from the end portions 4a, 4b and advance in step 200 to the next end portion pair 4a, 4b.

These method steps are performed with changing end portion pairs 4a, 4b until all end portion pairs 4a, 4b have been welded. Processing is then completed.

While the above description constitutes the preferred embodiment of the present invention, it will be appreciated that the invention is susceptible to modification, variation and change without departing from the proper scope and fair meaning of the accompanying claims.

The invention claimed is:

1. A method for processing conductor segments of a winding support of an electric motor, wherein at least two conductor segments are arranged on the winding support, wherein end portions of the conductor segments protrude out of ends of the winding support, wherein at least first and second processing units are guided along a guide device, comprising wherein each of the first and second processing units conduct the steps of:

advancing each of the processing units, which can be moved on a circular path along a guide device and comprises at least one first actuator element and at least one second actuator element, to at least one pair of the end portions having a first end portion and a second end portion, or advancing the first end portion and the second end portion to each of the processing units, bringing together the first actuator element and the second actuator element so that, in a clamping region, a clamping force brings together the first end portion and the second end portion into a welding position, and welding the first end portion and the second end portion, each of the processing units is controlled such that at least the first processing unit holds an end portion pair in the welding position while at least the second processing unit is moved to an end portion pair yet to be welded.

2. The method as claimed in claim 1 further comprising, the first actuator element and the second actuator element apply the clamping force to the end portion pair until the welding is complete.

3. The method as claimed in claim 1 further comprising, the bringing together of the first actuator element and the second actuator element takes place parallel to a radial direction of a central axis of the circular path.

4. The method as claimed in claim 1 further comprising, a plurality of the end portion pairs is present, and all of the end portion pairs are brought together and welded in succession.

5. The method as claimed in claim 1 further comprising, the processing units are controlled such that the first processing unit holds a first of the end portion pairs in the welding position while the second processing unit is moved to a second of the end portion pairs yet to be welded.

6. The method as claimed in claim 1 further comprising, at least one of the first actuator element or the second actuator element form an alignment geometry whereby, an alignment of the first end portion or of the second end portion takes place during the bringing together or in the welding position.

7. The method as claimed in claim 1 comprising, at least one of the end portion pairs lying on an inside of the circular path in a radial direction, starting from a central axis of the circular path, and at least one of the end portion pairs lying radially on an outside of the circular path in the radial direction, are brought together and welded successively or simultaneously.

8. The method as claimed in claim 1 further comprising, at least one end of the portion pairs lying on an inside of the circular path in a radial direction, starting from a central axis of the circular path, is brought together by the first actuator element and the second actuator element, and at least one of the end portion pairs lying radially on an outside of the circular path in the radial direction is brought together by a third actuator element and a fourth actuator element.

9. The method as claimed in claim 1 further comprising, the first actuator element or the second actuator element are actively cooled, at least during the welding.

10. The method as claimed in claim 1 further comprising, the welding takes place by a laser welding.

* * * * *